United States Patent [19]
Nakashima et al.

[11] Patent Number: 5,471,384
[45] Date of Patent: Nov. 28, 1995

[54] ELECTROMOBILE

[75] Inventors: Motohiro Nakashima, Nishio; Shinichi Otake, Okazaki, both of Japan

[73] Assignee: Aishin AW Co., Ltd., Japan

[21] Appl. No.: 120,906

[22] Filed: Sep. 15, 1993

[30] Foreign Application Priority Data

Sep. 17, 1992 [JP] Japan .................................. 4-247711

[51] Int. Cl.$^6$ ............................................. B60K 1/00
[52] U.S. Cl. ................... 364/424.01; 318/139; 180/65.1; 180/65.8
[58] Field of Search .................. 364/424.01, 424.05; 318/587, 139; 180/65.1, 65.2, 65.3, 65.8

[56] References Cited

U.S. PATENT DOCUMENTS

| | | | |
|---|---|---|---|
| 4,500,820 | 2/1985 | Noto et al. | 318/139 |
| 4,691,148 | 9/1987 | Nicholls et al. | 318/139 |
| 5,289,890 | 3/1994 | Toyoda et al. | 318/139 |
| 5,357,181 | 10/1994 | Mutoh et al. | 318/139 |
| 5,367,455 | 11/1994 | Kitagawa et al. | 180/65.1 |
| 5,389,825 | 2/1995 | Ishikawa et al. | 180/65.8 |
| 5,414,339 | 5/1995 | Masaki et al. | 318/139 |

*Primary Examiner*—Gary Chin
*Attorney, Agent, or Firm*—Lorusso & Loud

[57] ABSTRACT

An electromobile includes a motor; an output torque cutting commanding circuit for commanding the cutting of the output torque of the motor responsive to detection of a predetermined condition; and output torque command calculator for calculating an output torque command corresponding to the speed and accelerator opening of the electromobile and changing its output torque command to a value for stopping the motor in response to a command from the output torque cutting commanding circuit. A motor driving circuit feeds a motor current to the motor in accordance with the output torque command which is calculated by the output torque command calculator; and an output torque cutting circuit, packaged in the motor driving circuit for cutting the output torque of the motor in direct response to the command of the torque cutting commanding circuit.

10 Claims, 18 Drawing Sheets

ELECTROMOBILE

BACKGROUND OF THE INVENTION

1. Field of the Invention

The present invention relates to an electromobile (electric car) in which an internal combustion engine is replaced by an electric motor to reduce noises and eliminate emission of the engine exhaust gases.

2. Description of the Prior Art

The electromobile is run by the output torque produced by an electric motor to which a motor current is fed from a battery.

In a brushless motor composed of a rotor made of a permanent magnet and a stator coil, three-phase sinusoidal waves are generated corresponding to the-positions of the magnetic poles of the rotor. A current command is superposed on the sinusoidal waves by a motor controller to produce a PWM signal, which is converted into a sinusoidal phase current, i.e. a motor current, by an inverter circuit and is fed to the motor.

FIG. 2 is a block diagram showing an electromobile of the prior art. In FIG. 2 reference numeral 21 designates a shift switch for detecting the range position selected by the driver's manipulation of a shift lever (not-shown), i.e. the position of the shift lever. Numeral 22 represents a CPU equipped with RAM, ROM and the like for controlling the electromobile in its entirety; numeral 23 a motor controller for producing three-phase sinusoidal waves corresponding to the magnetic pole positions of the rotor to produce the PWM signal by superposing a current command upon the sinusoidal waves; and numeral 24 an inverter circuit composed of a plurality of power transistors for converting the PWM signal produced by the motor controller 23 into a motor current having the sinusoidal waves and fed to a motor 25. Numeral 26 designates a battery.

In the electromobile thus constructed, the output torque of the motor 25 is controlled by changing the current command also referred to as the output torque command. Moreover, the motor current is fed back to match the current command.

If neutral (N) or parking (P) is selected in the electromobile of this kind, the CPU 22 outputs a torque command to set the output torque to O.

In the electromobile in which the wheel axle and the motor 25 are directly connected, there is no means for disconnecting the axle from the motor 25. Thus, it is decided by the CPU 22 whether or not the drive wheels are to be rotated.

FIG. 3 is a schematic diagram showing an electromobile of the prior art, in which the axle and the motor are directly connected. In FIG. 3 reference numeral 21 designates a shift switch; numeral 22 a CPU numeral 23 a motor controller; numeral 24 an inverter circuit (INV); numeral 25 a motor; and numeral 27 drive wheels. The inverter circuit 24 converts the PWM signal produced by the motor controller 23 into the motor current and feeds the motor current to the motor 25. In this case, the CPU 22 outputs the drive signal to the inverter circuit 24 so that the motor 25 is energized to drive the drive wheels 27 when the drive signal is ON.

In the electromobile of the prior art described above, however, the CPU 22 calculates the output torque command and produces the drive signal. In case of a malfunction in the motor controller 23, in the switching elements of the inverter circuit 4 or in the CPU 22, therefore, it may be impossible to sufficiently control the motor current fed to the motor 25 or to set the output torque command to O.

SUMMARY OF THE INVENTION

An object of the present invention is to solve the aforementioned problems concomitant with the electromobile of the prior art and to provide an electromobile which can properly control the motor current fed to the motor.

In order to achieve the above-specified object, according to one aspect of the present invention, there is provided an electromobile including a motor; output torque cut commanding means for commanding the cutting of the output torque of the motor under a predetermined condition; output torque command calculating means for calculating an output torque command corresponding to the speed and accelerator opening of the electromobile and changing its output torque command to a value for stopping the motor in response to a command from the output torque cut commanding means; and a motor driving circuit for feeding a motor current to the motor in response to the output torque command which is calculated by the output torque command calculating means. Output torque cutting means is packaged in the motor driving circuit for cutting the output torque of the motor in direct response to the command of the torque cut commanding means.

In a normal state, therefore, the output torque command is calculated according to the vehicle speed and accelerator opening of the electromobile and is fed to the motor driving circuit to drive the motor.

If the predetermined condition is satisfied by selection of the neutral range or the parking range, the output torque cut commanding means commands the output torque command calculating means to cut the output torque of the motor. In response to the command of the output torque cut commanding means, the output torque command calculating means sets the output torque command to O, for example, to stop the motor.

The motor driving circuit is packaged in the output torque cutting means. In response to the command of the output torque cut commanding means, this output torque cutting means cuts the out-put torque of the motor. In this case, the command of the output torque cut commanding means is fed directly, i.e., not through the output torque command calculating means or the like, to the output torque cutting means so that the motor can be stopped even if the switching elements or the CPU malfunction.

According to another aspect of the present invention, there is provided an electromobile which includes a motor; a shift switch for detecting a range selected by a driver; a CPU for calculating an output torque command corresponding to the vehicle speed and the accelerator opening of the electromobile; a motor controller for outputting a signal for controlling the motor in response to the signal coming from the CPU; an inverter circuit for converting the signal of the motor controller into a motor current output to the motor; and torque cutting means connected between the shift switch and the inverter circuit for outputting a motor stopping signal directly to the inverter circuit in response to a torque cutting signal from the shift switch.

According to still another aspect of the present invention, the torque cutting means is replaced by a drive signal interrupting circuit connected between the motor controller and the inverter circuit for outputting a motor stopping signal directly to the inverter circuit in response to a torque cutting signal from the shift switch or the CPU.

DESCRIPTION OF THE PREFERRED EMBODIMENTS

Several preferred embodiments of the present invention will be described in detail with reference to the accompanying drawings.

Figure 1:
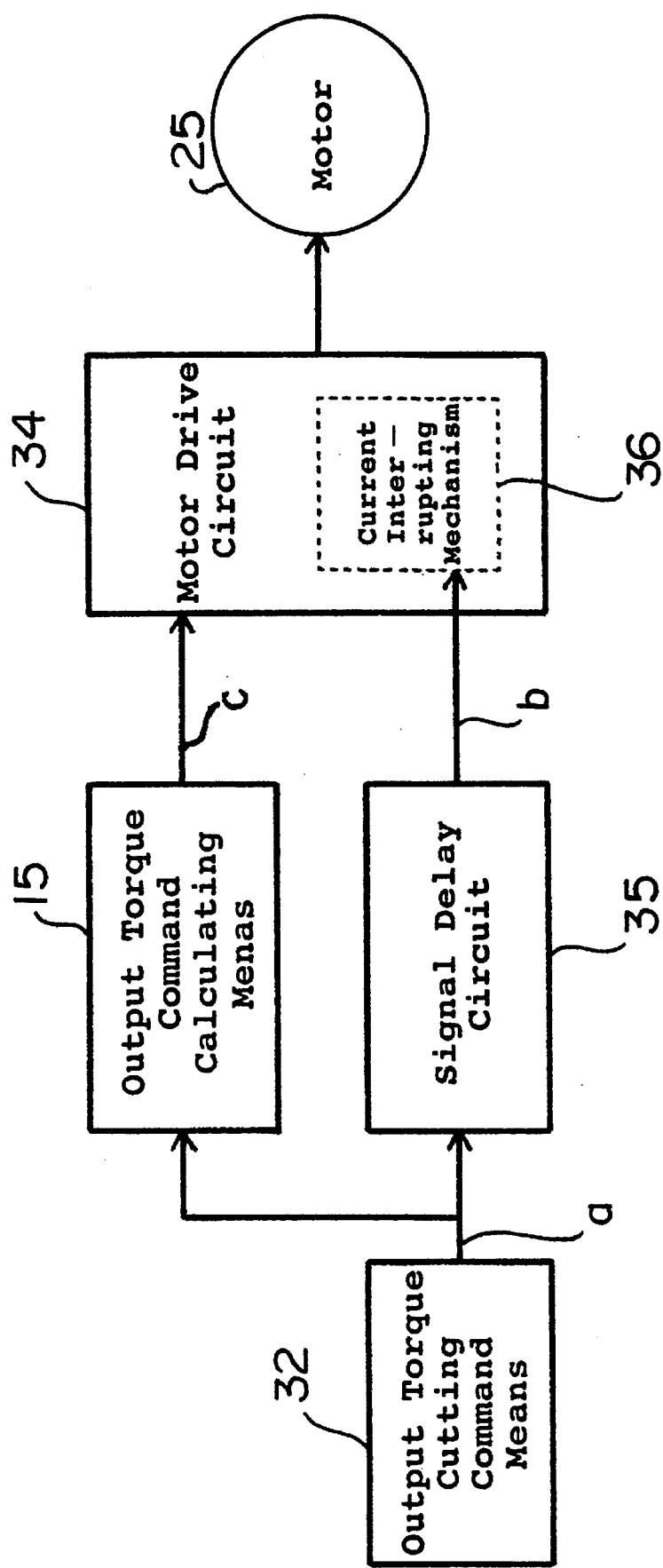
FIG. 1 is a block diagram showing a motor drive control circuit in an electromobile according to a first embodiment of the present invention.

In FIG. 1, reference numeral 25 designates a motor connected to drive wheels (not-shown), and numeral 32 designates output torque cut commanding means for commanding the cutting of output torque generated by the motor 25. The output torque cut commanding means 32 is exemplified by a neutral switch or a parking switch to be turned ON or OFF by manipulating a shift lever (not-shown), or a manual switch to be turned ON or OFF by hand manipulation.

Figure 2:
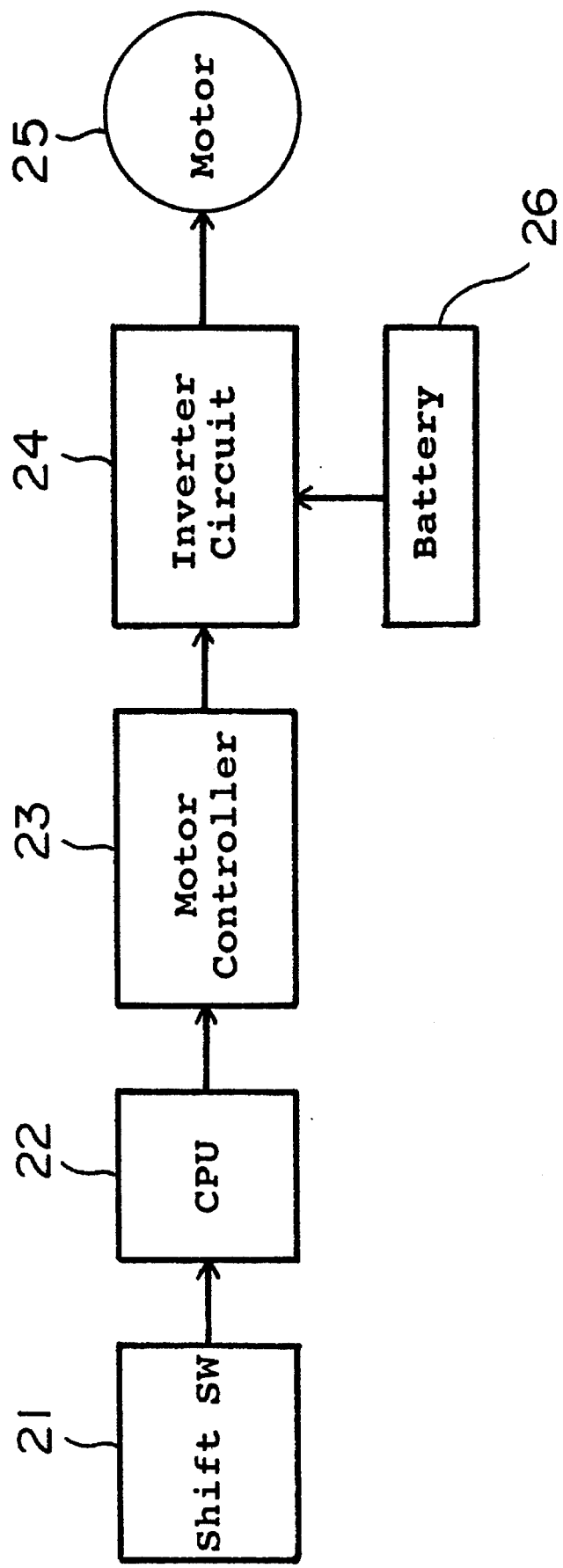
FIG. 2 is a block diagram showing a prior art electromobile.
Figure 3:
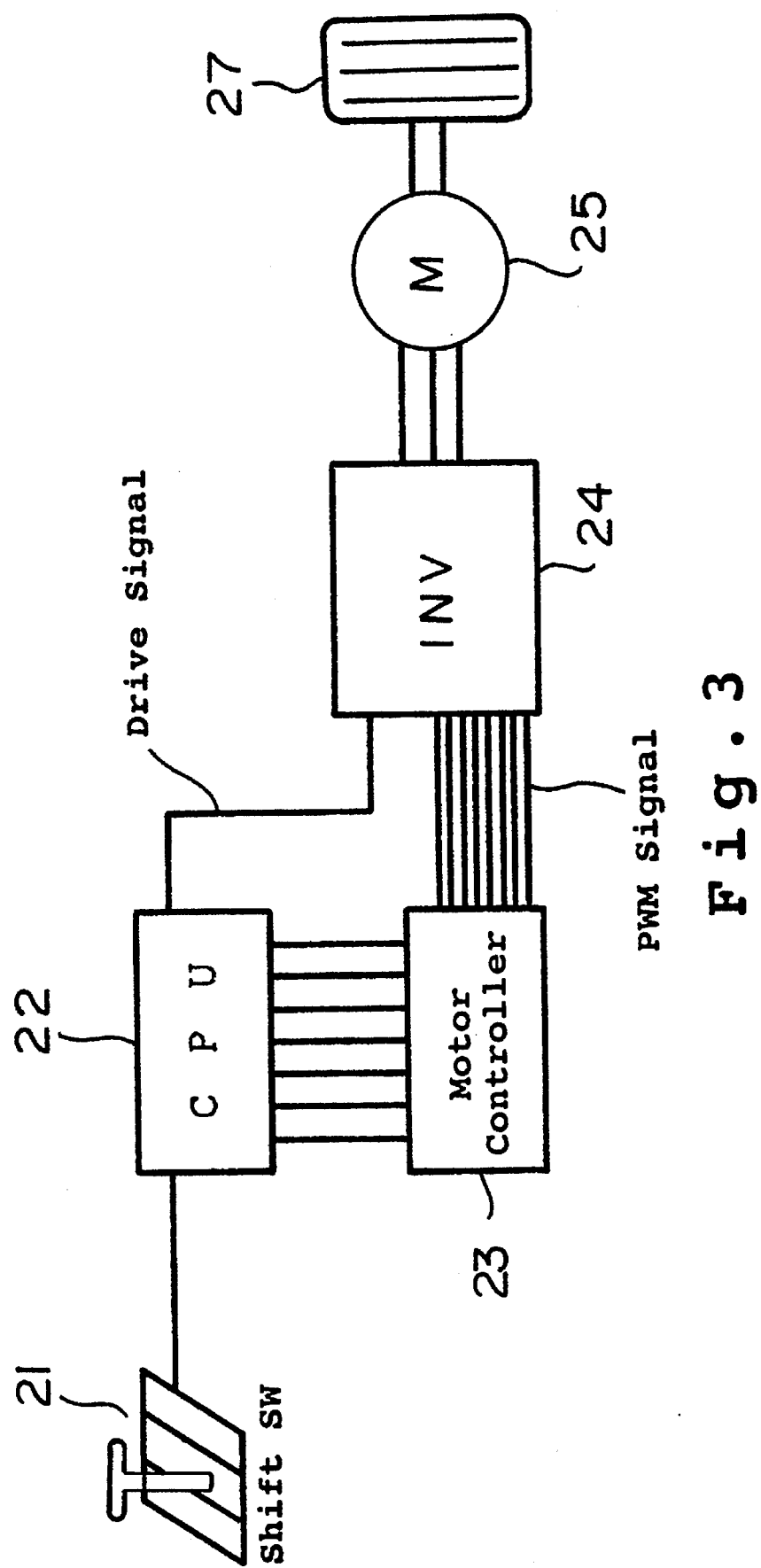
FIG. 3 is a schematic diagram showing a prior art electromobile, in which the axle and the motor are directly connected.
Figure 4:
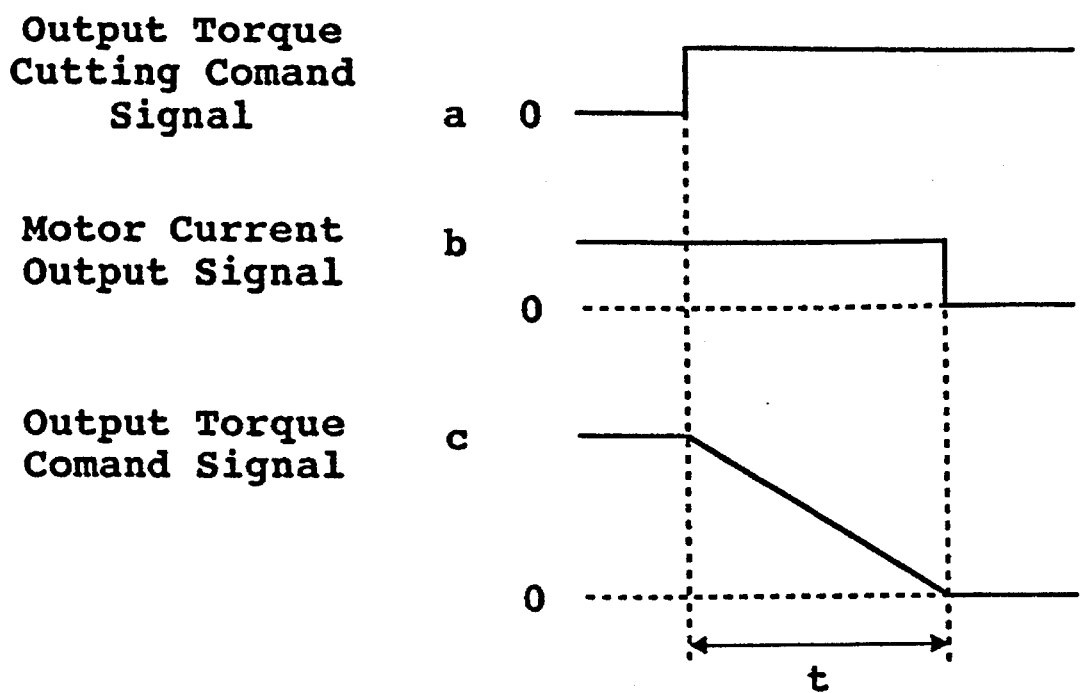
FIG. 4 is a time chart of the motor drive control circuit in the first embodiment of the present invention.

Reference numeral 15 designates a output torque command calculating means which is packaged in a CPU 22 (as shown in FIG. 2) and which responds to vehicle speed and accelerator opening detected by a vehicle speed sensor and an accelerator sensor (not shown), for calculating an output torque command according to those values. Numeral 34 designates a motor driving circuit for generating and feeding a motor current to the motor 25; numeral 35 a signal delay circuit; and numeral 36 a current interrupting mechanism acting as output torque cutting means, which is disposed in the motor driving circuit 34 for cutting output torque in response to the output torque cutting command signal a of the output torque cut commanding means 32.

In the motor drive control circuit thus constructed, the output torque command calculating means 15 calculates the output torque command from the detected vehicle speed and the detected accelerator opening and outputs an output torque command signal c to the motor driving circuit 34. The motor driving circuit 34 drives the motor 25 responsive to the output torque command.

If the driver manipulates the shift lever or the manual switch directly, to select the neutral or parking range and to command the cutting of the output torque, the output torque cut commanding means 32 outputs the output torque cutting command signal a. In response to this output torque cutting command signal a, the output torque command calculating means 15 sets the output torque command to a value such as 0 to stop the motor 25. In response to the output torque command, the motor driving circuit 34 interrupts the feed of the motor current to the motor 25.

On the other hand, the output torque cut commanding means 32 is connected through the signal delay circuit 35 with the current interrupting mechanism 36 in the motor driving circuit 34 so that it outputs the output torque cutting command signal a directly to the current interrupting mechanism 36, not through the CPU 22. As a result, the motor 25 can be stopped without fail by the output torque cutting command signal a even if the output torque command calculating means 15 or the motor driving circuit 34 should malfunction.

In the present invention, if the motor current is interrupted, the cutting of the output torque were to be commanded instantly during the running of the electromobile, so that the output torque is abruptly cut, a shock would result. Therefore, between the output torque cut commanding means 32 and the current interrupting mechanism 36, is connected a hardware signal delay circuit 35, by which the output torque cutting command signal a is delayed by a delay time t to produce a motor current output signal b, so that this motor current output signal b is input to the current interrupting mechanism 36.

Moreover, the output torque cut commanding means 32 is further connected with the output torque command calculating means 15 so that the output torque cutting command signal a is also input to the output torque command calculating means 15. This output torque command calculating means 15 ordinarily calculates the output torque command from the vehicle speed or the accelerator opening and outputs the calculated command to the motor driving circuit 34. In response to the output torque cutting command signal a, however, the output torque command calculating means 15 decreases the output torque command gradually by its software to set the output torque command to 0 over the aforementioned delay time t.

As a result, the motor driving circuit 34 feeds the motor 25 with a motor current corresponding to the output torque command so that the abrupt fluctuation of the output torque can be eliminated to prevent any shock.

Figure 5:
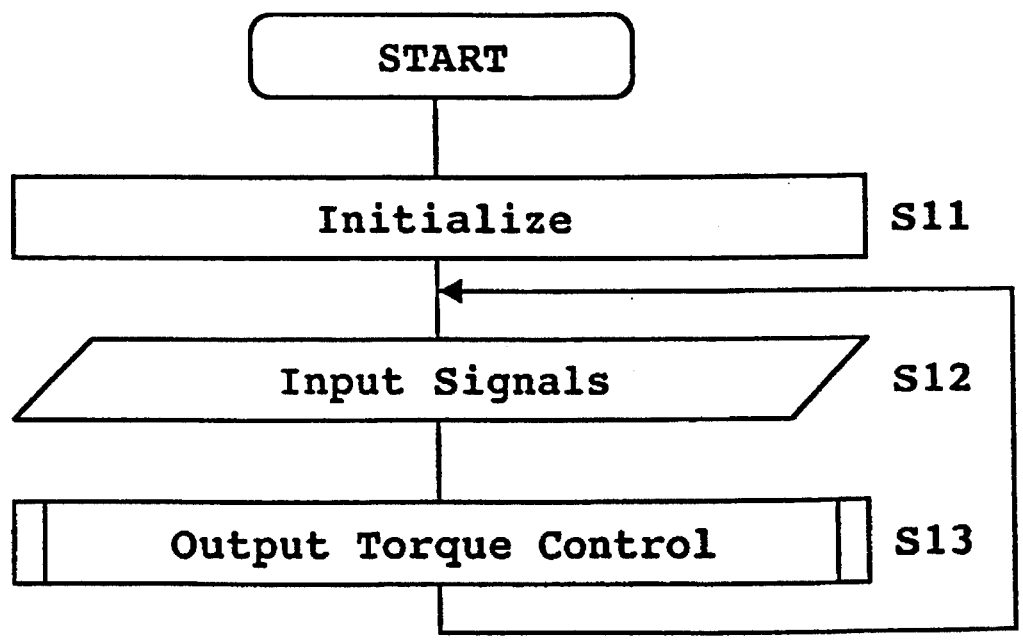
FIG. 5 is a flow chart showing the main operations of the motor drive control circuit in the first embodiment of the present invention.

As illustrated in FIG. 5 motor drive control is effected by the motor driving circuit 34 as follows:

Step S11:
   The routine is initialized.
Step S12:
   Signals of the vehicle speed, the accelerator opening and the like are inputted.
Step S13:
   The output torque control executed, and the routine returned to Step S12.

Figure 6:
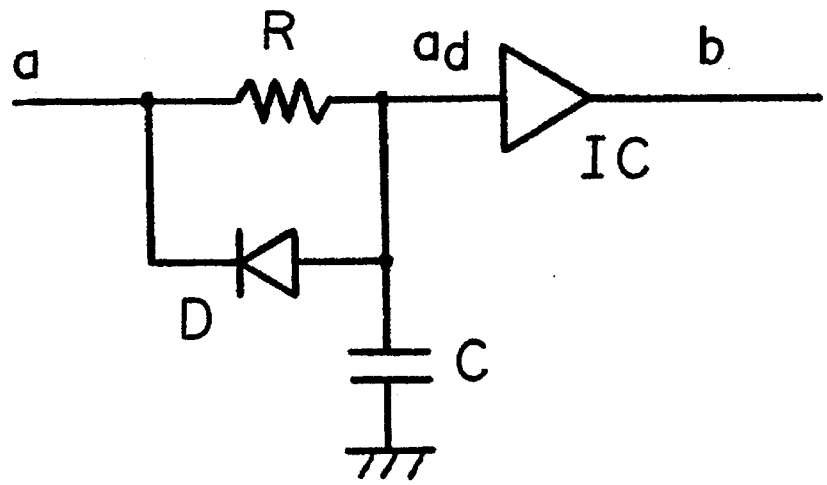
FIG. 6 is a diagram showing the delay circuit in the first embodiment of the present invention.
Figure 7:
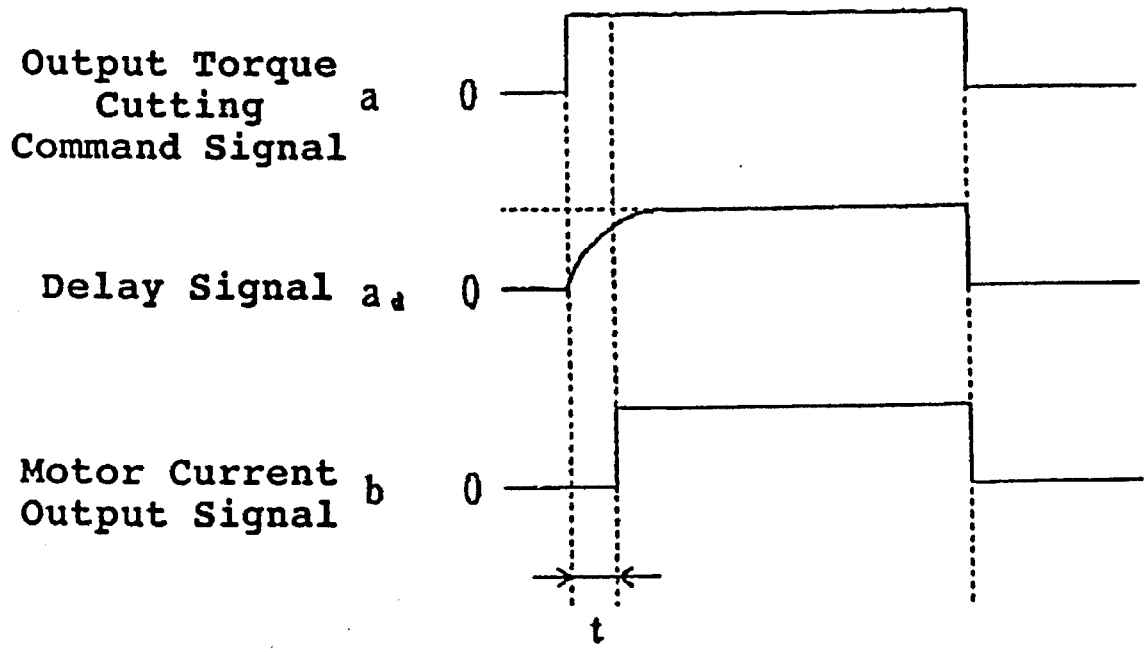
FIG. 7 is a time chart of the delay circuit in the first embodiment of the present invention.
Figure 8:
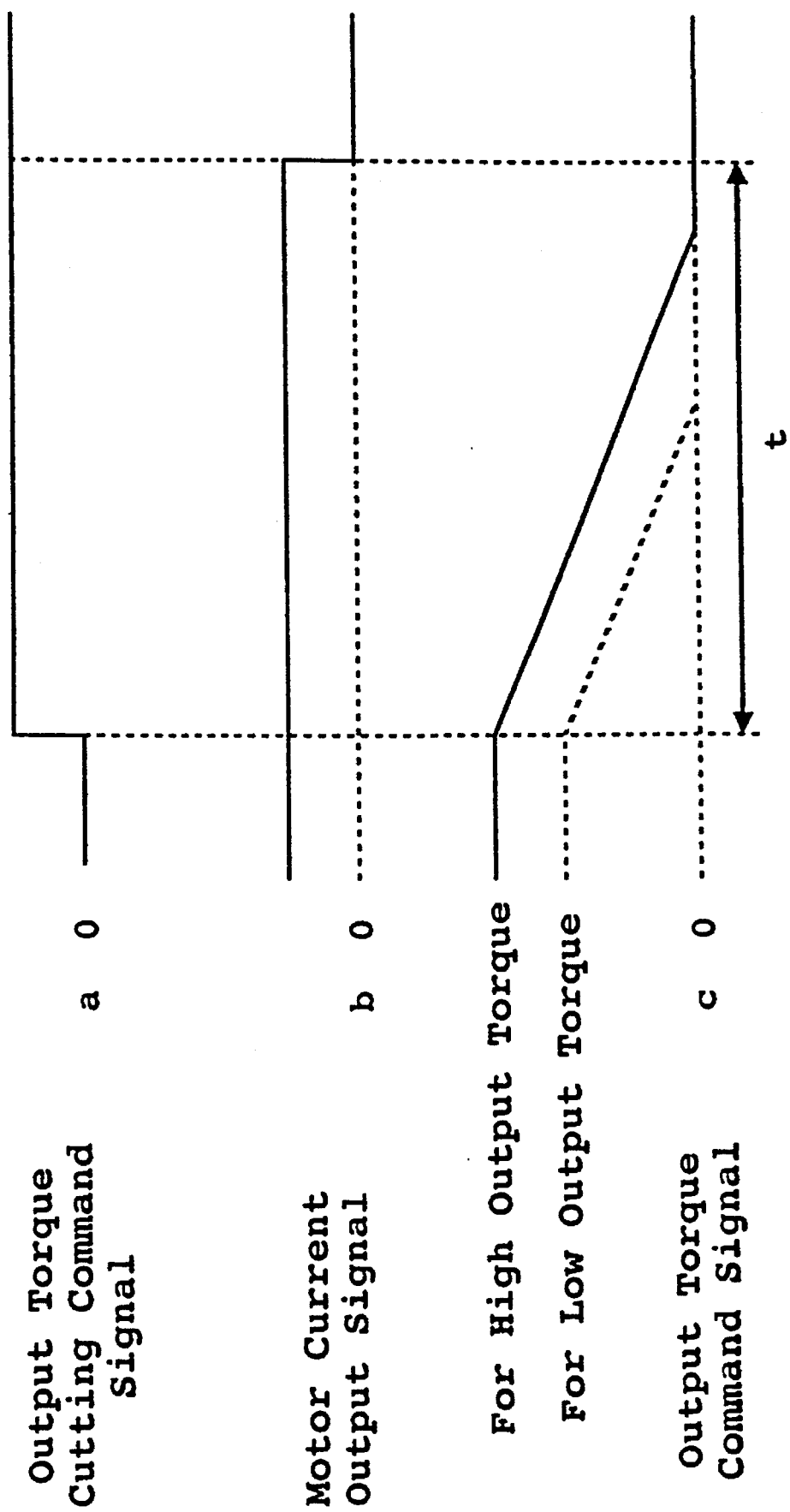
FIG. 8 is a diagram explaining the delay time in the first embodiment of the present invention.

In FIG. 6: reference letter R designates a resistor; letter C a capacitor; letter D a diode; and letters IC an amplifier. In this case, when the output torque cutting command signal a is inputted, a delay signal $a_d$ is generated between the resistor R and the amplifier IC so that the motor current output signal b is output from the output terminal of the amplifier IC. By slicing the delay signal $a_d$ at a predetermined level, moreover, it is possible to obtain the delay time t, as shown in FIG. 7. This delay time t may be set to a larger value than the time for decreasing the output torque command gradually from maximum to 0, as shown in FIG. 8. Here, the delay time t is expressed by the following formula:

$$t = -R \cdot C \cdot \log(1 - V_{ICON}/V_{CC}),$$

$V_{ICON}$: Input voltage when the amplifier IC is at the high level; and $V_{CC}$: Voltage when the output torque cutting command signal a is at the high level.

Here will be described a transient torque control for decreasing the output torque command gradually in the first embodiment of the present invention. It is assumed that the output torque command calculated from the detected vehicle speed and the detected accelerator opening, i.e., the target torque is designated $T_1$, the output torque command of the previous time (hereinafter "previous command") is designated $T_0$, and the output torque command to be actually issued at this time (hereinafter "present command") is designated $T_{out}$. Then, the difference between the previous command $T_0$ and the target torque $T_1$, i.e., the command difference $\Delta T$ is expressed by:

$$\Delta T = T_1 - T_0.$$

Figure 9:
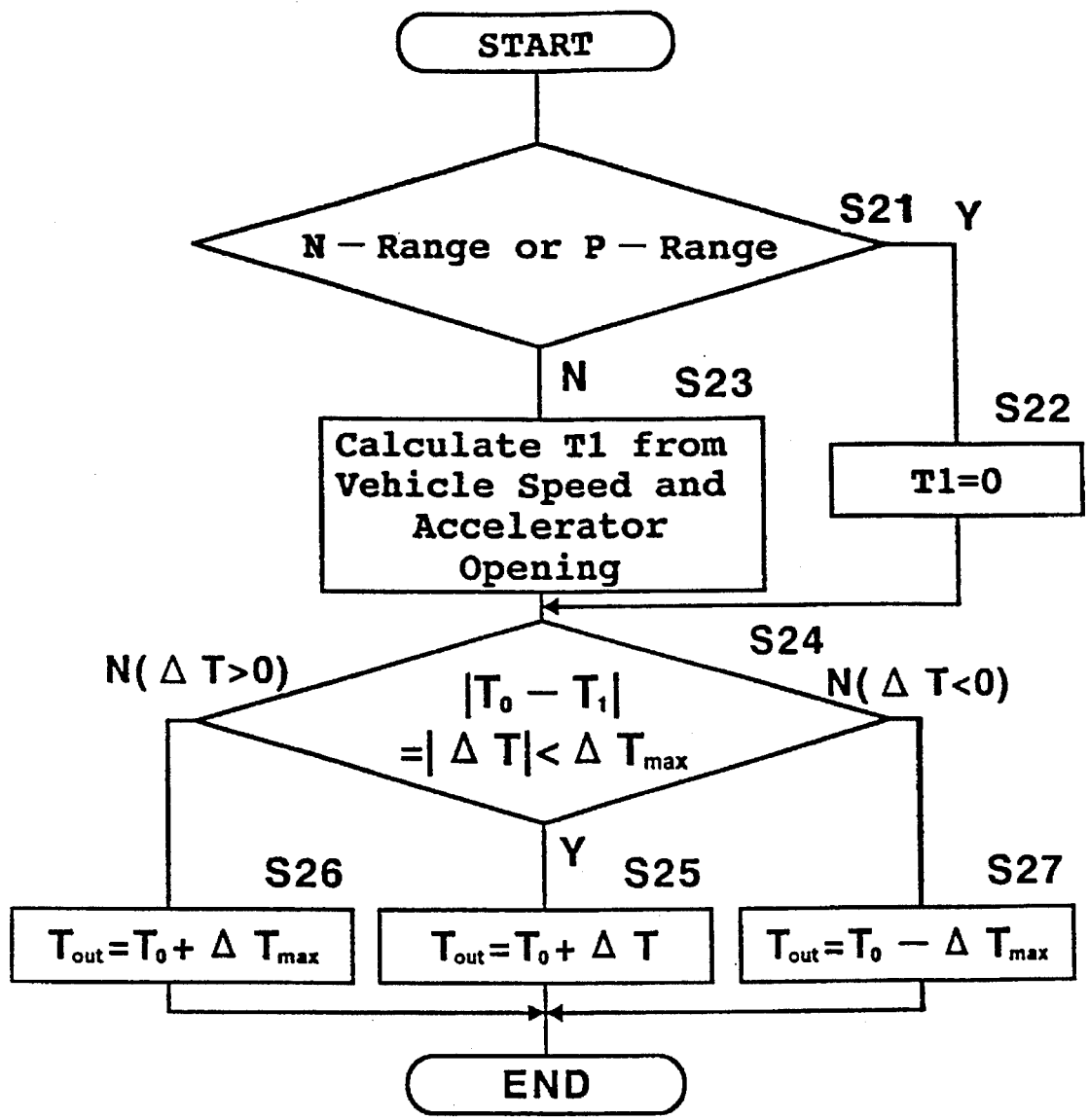
FIG. 9 is a flow chart showing the operations of the transient torque control in the first embodiment of the present invention.

Moreover, the target torque $T_1$ is used as is as the present command $T_{out}$ if the command difference $\Delta T$ is within a predetermined range, but the change in the output torque command is reduced if the range is exceeded. This control flow is illustrated in FIG. 9 as follows:

Step S21:
   It is decided whether or not the selected range is in the neutral range or the parking range. The routine advances to Step S22, if the answer is YES, but otherwise to Step S23.
Step S22:
   The target torque $T_1$ is set to 0.
Step S23:
   The target torque $T_1$ is calculated from the vehicle speed and the accelerator opening.
Step S24:
   The absolute value of the command difference $\Delta T$ between the previous command $T_0$ and the target torque $T_1$ is compared with the absolute value $\Delta T_{max}$ of the command difference $\Delta T$.

The routine advances to Step S25, if $$|T_0-T_1|=|\Delta T|<\Delta T_{max}.$$

The routine advances to Step S26, if $$|T_0-T_1|=|\Delta T|\geq \Delta T_{max},$$

and if $$\Delta T>.$$

The routine advances to Step S27, if $$|T_0-T_1|=|\Delta T|\geq T_{max},$$

and if $$\Delta T<0.$$

Step S25:
   The present command $T_{out}$ is set to target torque $T_1$, i.e., the addition of the command difference $\Delta T$ to the previous command $T_0$ Step
Step S26: The present command $T_{out}$ is set to the sum of the maximum $\Delta T_{max}$ of the command difference $\Delta T$ and the previous command $T_0$.
Step S27: The previous command $T_{out}$ is set by subtraction of the maximum $\Delta T_{max}$ of the command difference $\Delta T$ from the previous command $T_0$.

In another transient torque control, on the other hand, the abrupt fluctuation of the output torque can be further reduced to prevent shock by satisfying the following formulas:

$$D=T_1-T_0=\Delta T;$$

and $$T_{out}=T_0+D/4.$$

Figure 10:
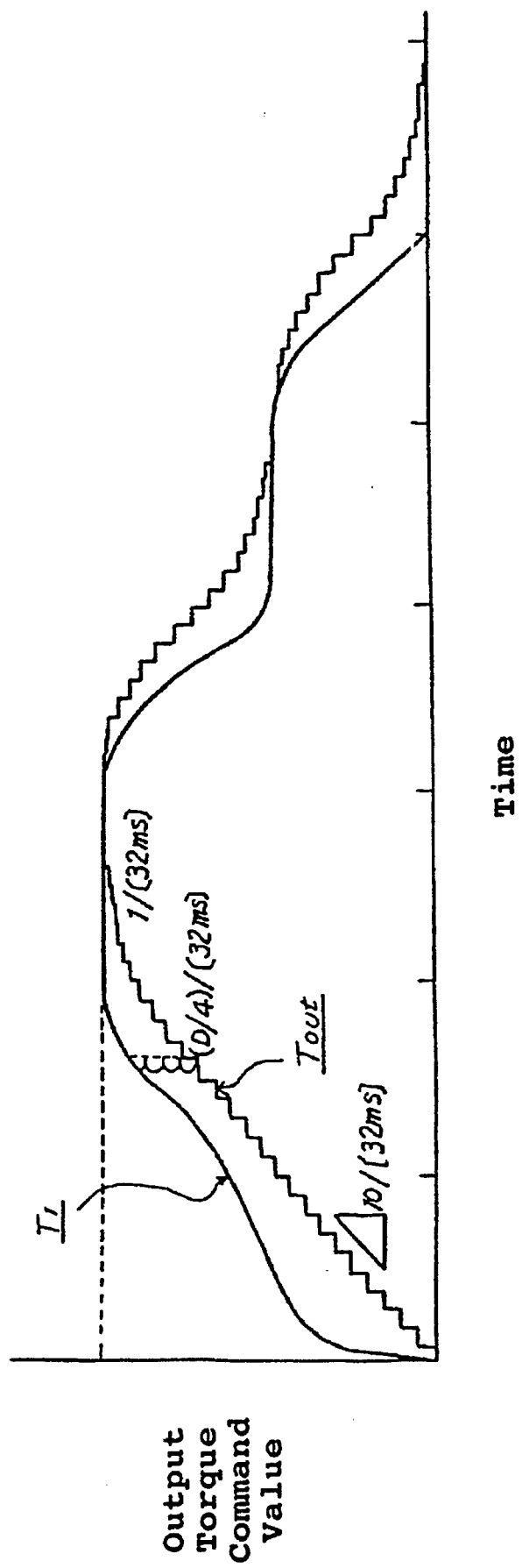
FIG. 10 is a time chart showing another transient torque control.

However, if the target torque $T_1$ has an extremely high changing rate, the upper limit of the value D is set to 10/32 [ms]. In this manner, it is possible to accomplish the transient torque control shown in FIG. 10.

Figure 11:
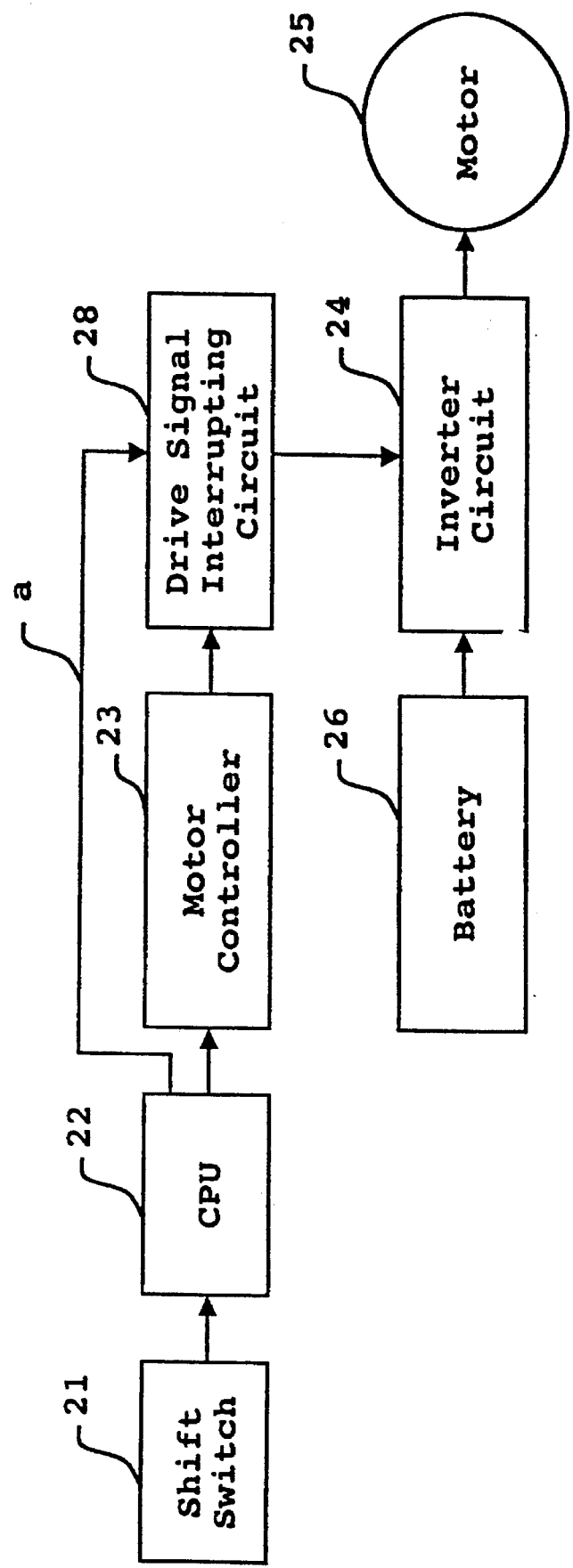
FIG. 11 is a block diagram showing an electromobile according to a second embodiment of the present invention.

A second embodiment of the present invention will now be described with reference to FIG. 11. In FIG. 11 reference numeral 21 designates a shift switch; numeral 22 a CPU; numeral 23 a motor controller; numeral 24 an inverter circuit; numeral 25 a motor; numeral 26 a battery; and numeral 28 a drive signal interrupting circuit acting as output torque cutting means connected between the motor controller 23 and the inverter circuit 24.

In this case, the PWM signal generated by the motor controller 23 is output to the inverter circuit 24 so that it may be changed into a sinusoidal wave motor current. When the output torque cut command signal a is output from the CPU 22, the drive signal interrupting circuit 28, if connected between the controller 23 and the inverter circuit 24, interrupts the output of the PWM signal. Then, the output torque cutting command signal a is output directly to the drive signal interrupting circuit 28, not through the motor controller 23. As a result, the motor 25 can be stopped without fail by the output torque cut command signal a even if the motor controller 23 malfunctions.

Figure 12:
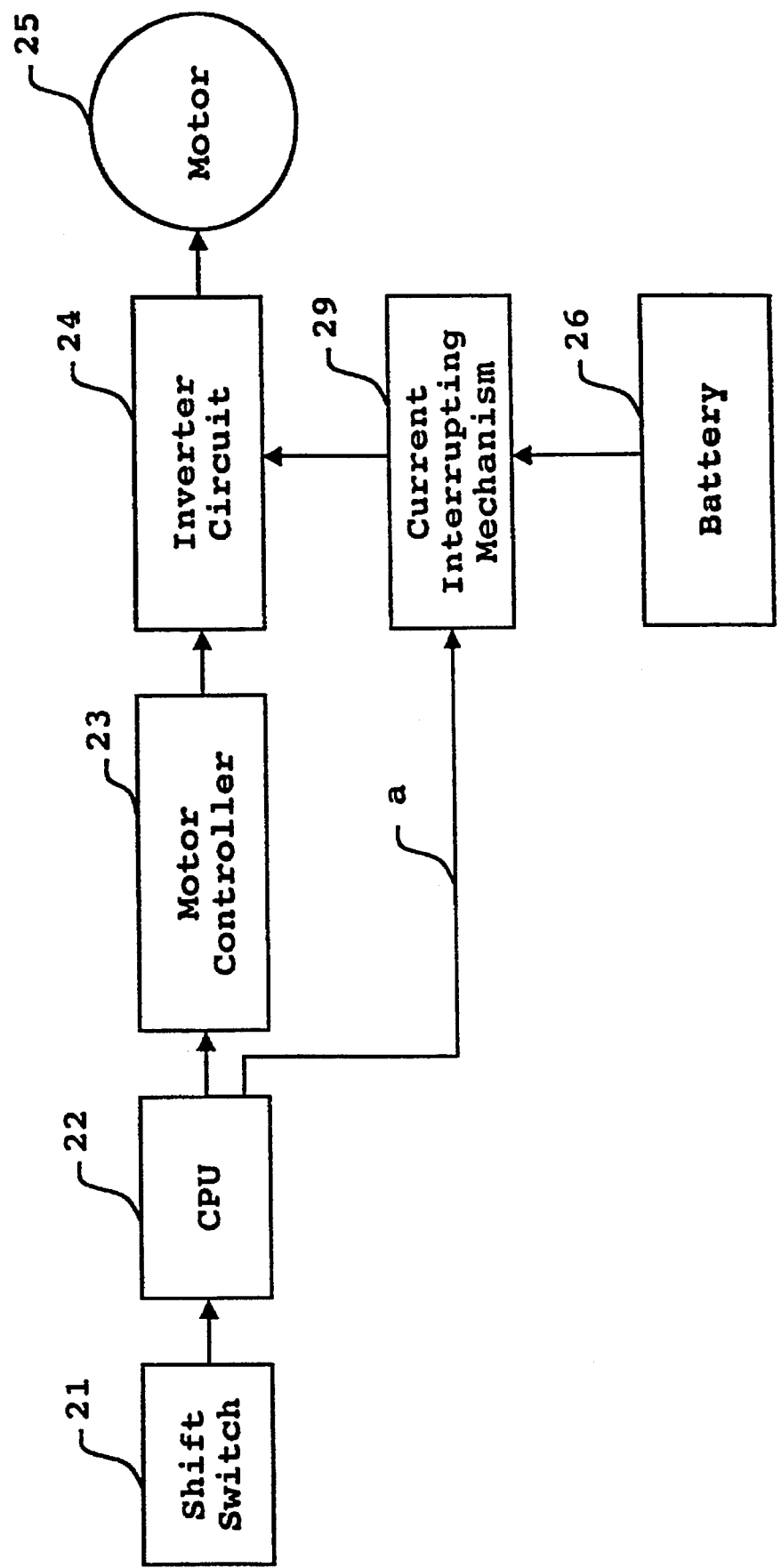
FIG. 12 is a block diagram showing an electromobile according to a third embodiment of the present invention.

A third embodiment of the present invention will now be described with reference to FIG. 12. In FIG. 12 reference numeral 21 designates a shift switch; numeral 22 a CPU; numeral 23 a motor controller; numeral 24 an inverter circuit; numeral 25 a motor; numeral 26 a battery; and numeral 29 a current interrupting mechanism, acting as the output torque cutting means, connected between the battery 26 and the inverter circuit 24.

In this case, the PWM signal generated by the motor controller 23 is output to the inverter circuit 24 so that it may be changed into a sinusoidal wave motor current. If the output torque cut command signal a is output from the CPU 22, the current interrupting mechanism 29, if connected between the battery 26 and the inverter circuit 24, interrupts the current feed from the battery 26. Then, the output torque cutting command signal a is output directly to the current interrupting mechanism 29, not through the motor controller 23. As a result, the motor 25 can be stopped without fail by the output torque cut command signal a even if the motor controller 23 malfunctions.

Figure 13:
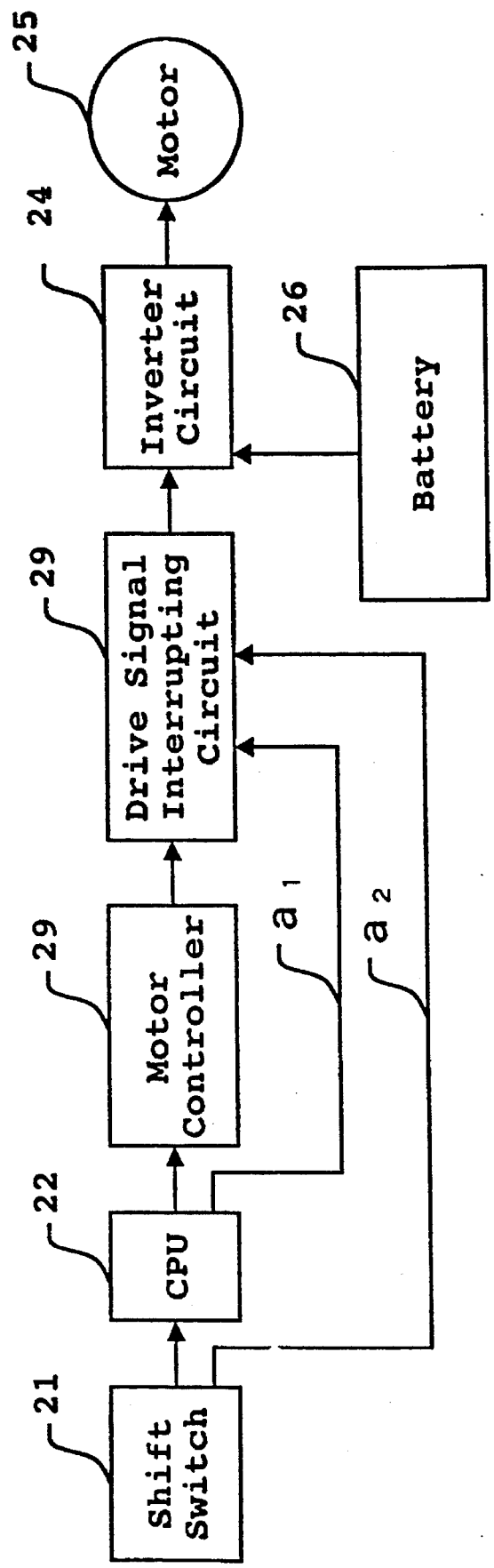
FIG. 13 is a block diagram showing an electromobile according to a fourth embodiment of the present invention.

A fourth embodiment of the present invention will now be described with reference to FIG. 13. In FIG. 13 reference numeral 21 designates a shift switch; numeral 22 a CPU; numeral 23 a motor controller; numeral 24 an inverter circuit; numeral 25 a motor; numeral 26 a battery; and numeral 28 a drive signal interrupting circuit, acting as output torque cutting means, connected between the motor controller 23 and the inverter circuit 24.

In this case, the PWM signal generated by the motor controller 23 is output to the inverter circuit 24 so that it may be changed into a sinusoidal wave motor current. If a first output torque cut command signal $a_1$ is output from the CPU 22 and if a second output torque cut command signal $a_2$ is output from the shift switch 21, the drive signal interrupting circuit 28, if connected between the controller 23 and the inverter circuit 24, interrupts the output of the PWM signal. Then, the first output torque cutting command signal $a_1$ is output directly to the drive signal interrupting circuit 28, not through the motor controller 23. As a result, the motor 25 can be stopped without fail by the first output torque cut command signal $a_1$ even if the motor controller 23 malfunctions. On the other hand, the second output torque cut command signal $a_2$ is output directly to the drive signal interrupting circuit 28, not through the CPU 22 and the motor controller 23. As a result, even if the switching circuit of the CPU 22 or the inverter malfunctions, the motor 25 can be stopped without fail by the second output torque cutting command signal $a_2$ if the driver moves the shift lever to a non-drive range such as the N-range or the P-range.

Figure 14:
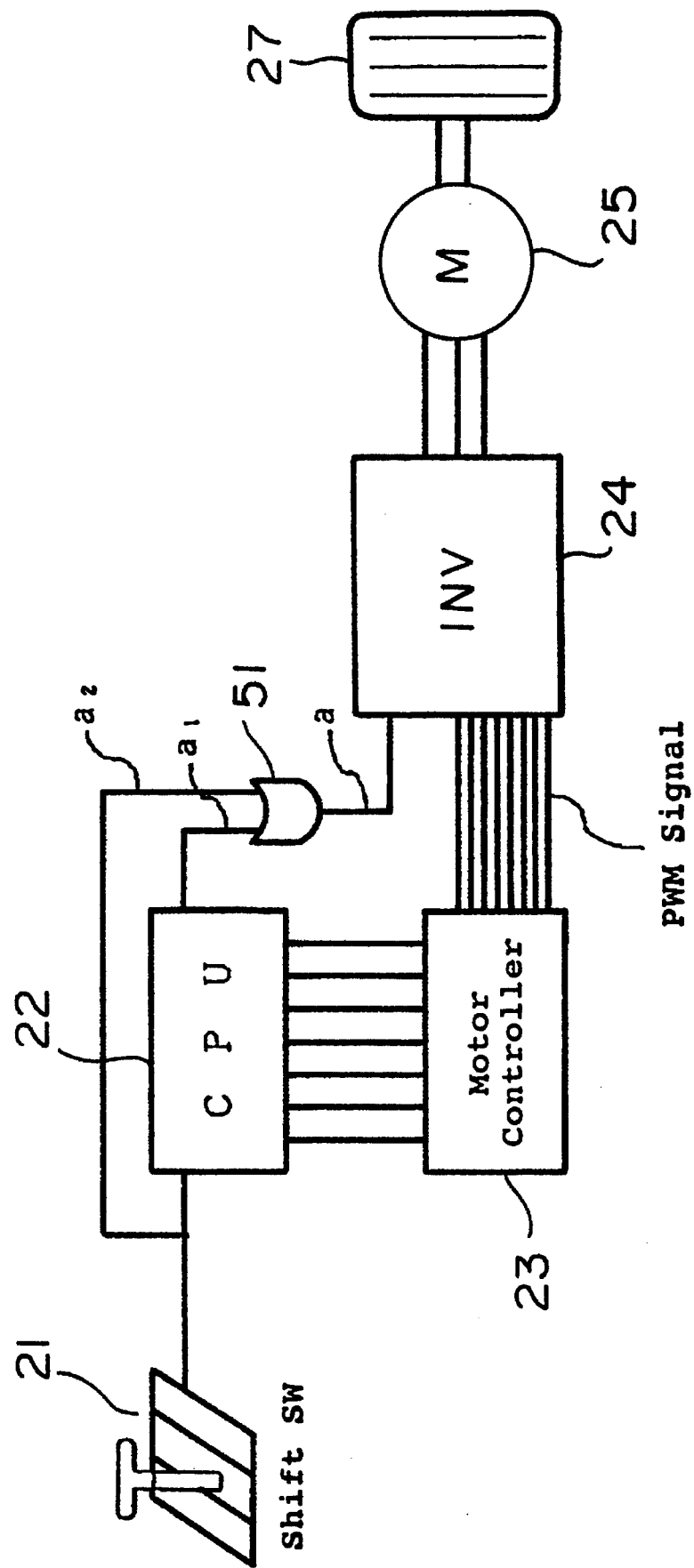
FIG. 14 is a block diagram showing an electromobile according to a fifth embodiment of the present invention.

A fifth embodiment of the present invention will now be described with reference to FIG. 14. In FIG. 14 reference numeral 21 designates a shift switch; numeral 22 a CPU; numeral 23 a motor controller; numeral 24 an inverter circuit; numeral 25 a motor; and numeral 27 drive wheels. The inverter circuit 24 converts the PWM signal generated by the motor controller 23 into the motor current and feeds the motor current to the motor 25 to rotate the drive wheels 27. In this case, the first output torque cut command signal $a_1$ and the second output torque cut command signal $a_2$ are respectively output from the CPU 22 and the shift switch 21 to an OR gate 51 so that the output torque cut command signal a is output from the OR gate 51 to the inverter circuit 24. In response to the output torque cut command signal a, the inverter circuit 24 interrupts the feed of the motor current to the motor 25.

Moreover, the first output torque cut command signal $a_1$ is output directly to the inverter circuit 24, not through the motor controller 23. As a result, the motor 25 can be stopped without fail by the output torque cut command signal a even if the motor controller 23 malfunctions. On the other hand, the second output torque cut command signal $a_2$ is output directly to the inverter circuit 24, not through the CPU 22 and the motor controller 23. As a result, the motor 25 can be stopped without fail by the output torque cutting command signal a even if the CPU 22 malfunctions.

Figure 15:
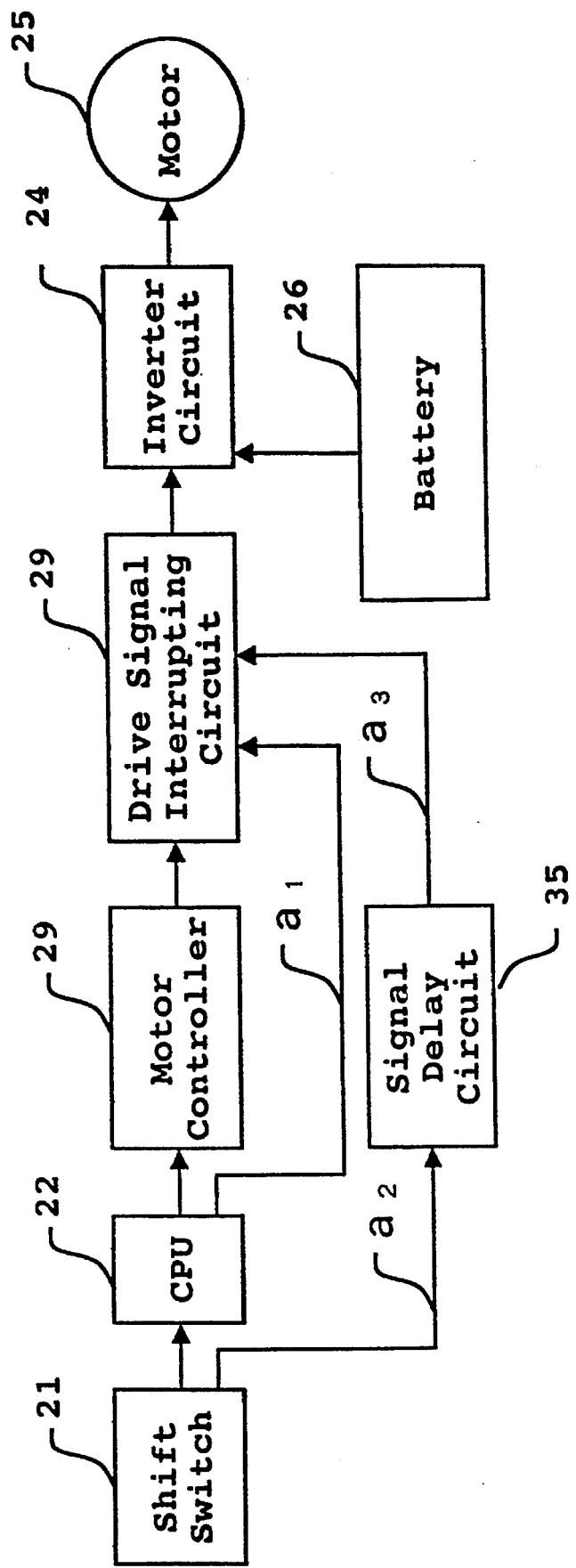
FIG. 15 is a block diagram showing an electromobile according to a sixth embodiment of the present invention.

A sixth embodiment of the present invention will now be described with reference to FIG. 15. In FIG. 15 reference numeral 21 designates a shift switch; numeral 22 a CPU; numeral 23 a motor controller; numeral 24 an inverter circuit; numeral 25 a motor; numeral 26 a battery; and numeral 28 a drive signal interrupting circuit, acting as output torque cutting means, connected between the motor controller 23 and the inverter circuit 24. In this case, the PWM signal generated by the motor controller 23 is output to the inverter circuit 24 so that it may be changed into a sinusoidal wave motor current. When a first output torque out command signal $a_1$ is output from the CPU 22 and if a second output torque cut command signal $a_2$ is output from the shift switch 21, the drive signal interrupting circuit 28, if connected between the controller 23 and the inverter circuit 24, interrupts the output of the PWM signal. Then, the first output torque cut command signal $a_1$ is output directly to the drive signal interrupting circuit 28, not through the motor controller 23. As a result, the motor 25 can be stopped without fail by the first output torque cut command signal $a_1$ even if the motor controller 23 malfunctions. On the other hand, the second output torque cut command signal $a_2$ is output directly to the drive signal interrupting circuit 28, not through the CPU 22 and the motor controller 23. As a result, even if the CPU 22 malfunctions, the motor 25 can be stopped without fail by the second output torque cut command signal $a_2$.

In the foregoing embodiments, if the second output torque cut command signal $a_1$ of the shift switch 21 were to be instantly input to the drive signal interrupting circuit 28 to cut the output torque, the output torque would abruptly stop producing shock. Between the shift switch 21 and the drive signal interrupting circuit 28, therefore, there is connected signal delay circuit 35 for delaying the second output torque cut command signal $a_2$ by a delay time t to produce and input a third output torque cut command signal $a_3$ to the drive signal interrupting circuit 28.

In the foregoing embodiments, the vehicle speed and the accelerator opening are detected and used to calculate the output torque command. An output torque command for an accelerator opening of 100% is calculated with reference to an output torque command map and by multiplying the value for the accelerator opening of 100% by a torque output factor which is determined by referring to a torque output factor map.

The output torque command map and the torque output factor map are prepared by taking into consideration the power performance and the electric energy consumption efficiency of the electromobile, but the electric energy consumption efficiency cannot be increased with the power performance also being increased. Thus, both the power performance and the electric energy consumption efficiency are set to compromise points so that the electromobile cannot be driven completely according to the driver's taste. Therefore, in the electromobile of the present invention the output torque command map and the torque output factor map can be switched to suit the driver's taste.

Figure 16:
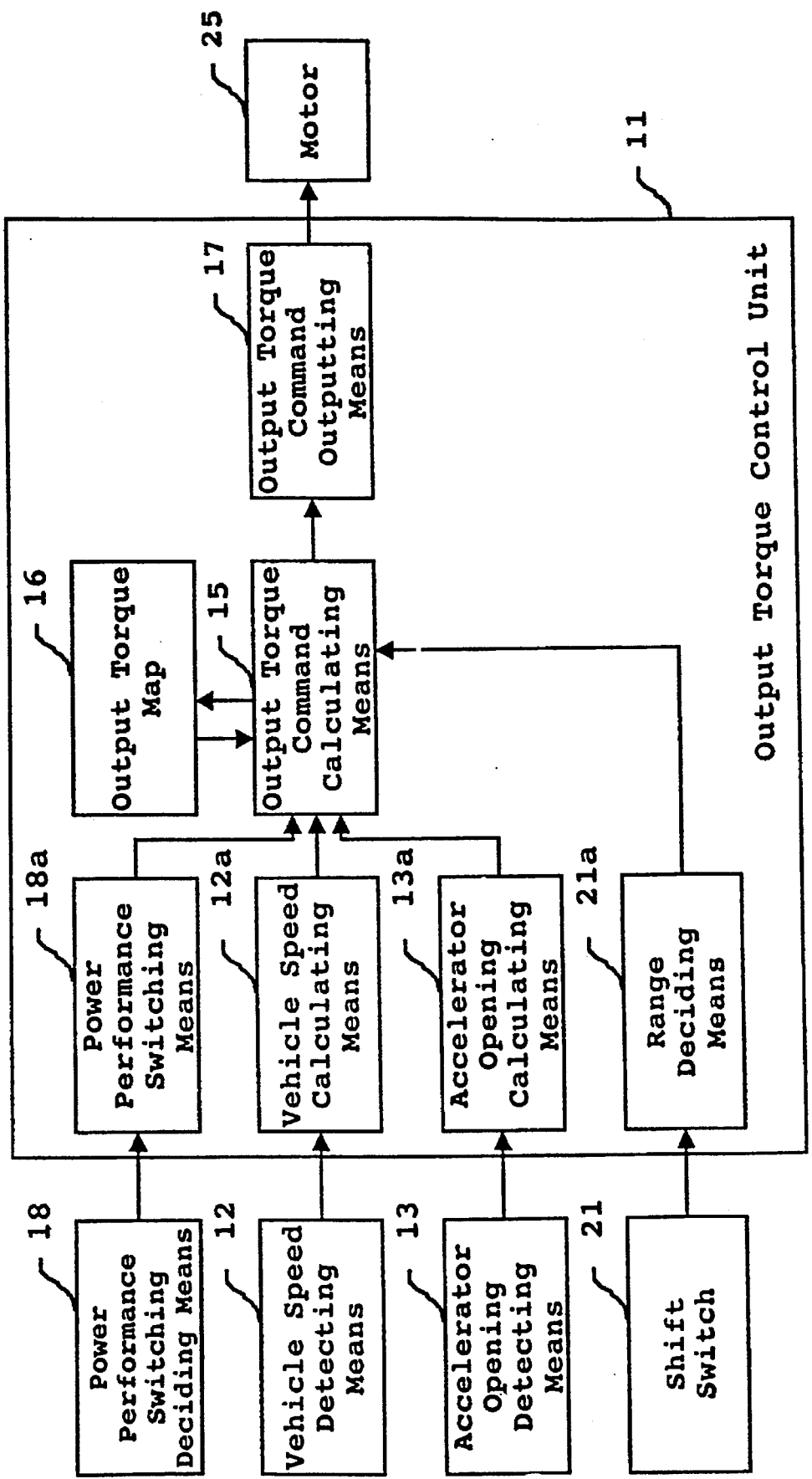
FIG. 16 is a block diagram showing an output torque control unit for an electromobile according to the embodiments of the present invention.

In FIG. 16 reference numeral 11 designates an output control unit composed of a CPU, RAM, ROM and the like, although not shown; numeral 12 represents vehicle speed detecting means such as a r.p.m. sensor for detecting the speed of the electromobile, for example, in terms of the r.p.m. of the output shaft of the motor 25. Numeral 13 is an accelerator opening detecting means such as a acceleration sensor for detecting the accelerator opening in terms of the depression of an accelerator pedal (not shown). Numeral 21 designates a shift switch for detecting the range, which is selected by the driver's manipulation of a shift lever, i.e. shift lever position or range position. Numeral 18 designates power performance switching means for detecting the switching of the power performance such as a power mode or an economy mode, which is effected by the manipulation of a power/economy mode switch (not shown).

Numeral 12a designates vehicle speed calculating means for calculating the vehicle speed from the r.p.m. signal of the vehicle speed detecting means 12; numeral 13a accelerator opening calculating means for calculating the accelerator opening from the signal representative of the accelerator pedal depression of the accelerator opening detecting means 13; numeral 21a range deciding means for deciding a selected range from the signal of the range position of the shift switch 21; and numeral 18a power performance switching deciding means for deciding the switching of the power performance from the switching signal of the power performance switching means 18.

Figure 17:
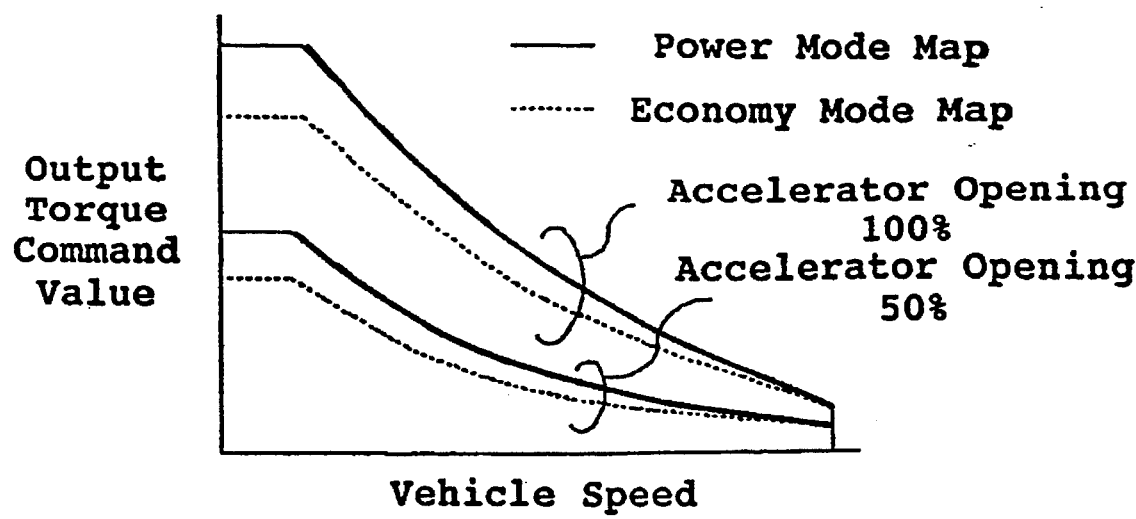
FIG. 17 is an output torque command map to be used in the output torque control unit.
Figure 18:
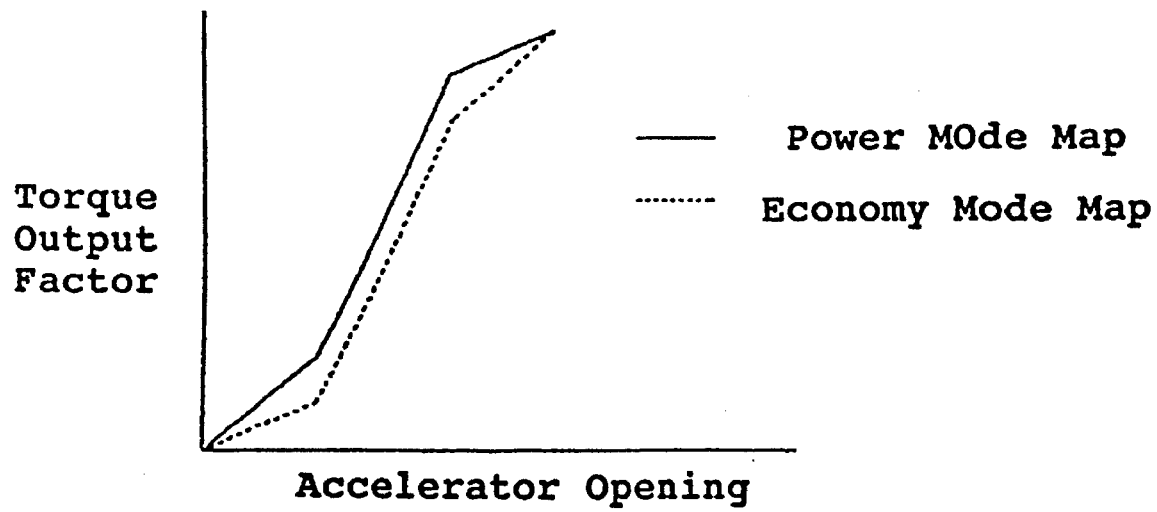
FIG. 18 is a torque output factor map to be used in the output torque control unit.
Figure 19:
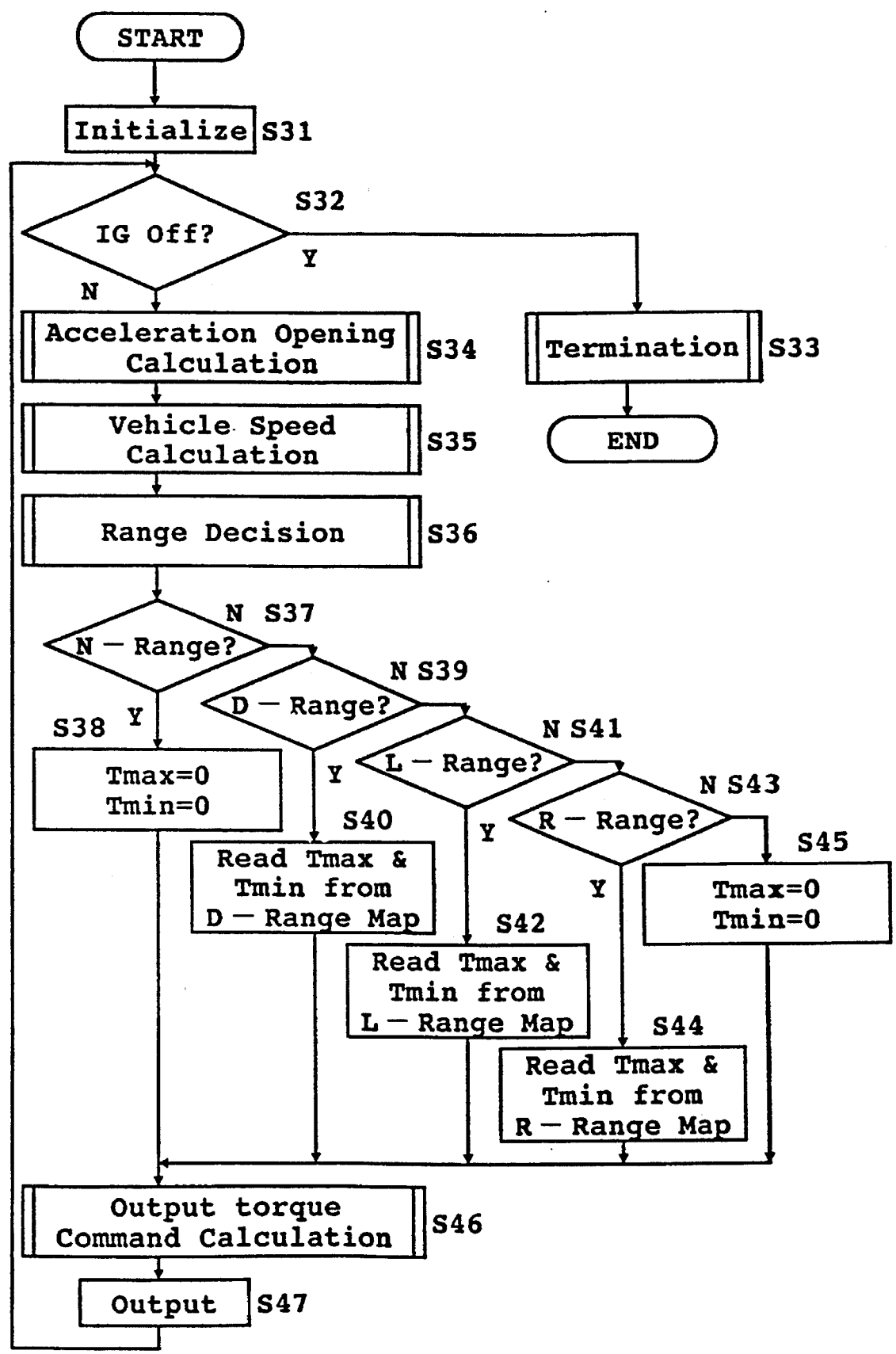
FIG. 19 is a flow chart showing the operations of the output torque control unit.

Numeral 15 designates output torque command calculating means for calculating the output torque command in response to the signal for the vehicle speed calculated by the vehicle speed calculating means 12a, the signal for the accelerator opening calculated by the accelerator opening calculating means 13a, the signal for range decided by the range deciding means 21a and the signal for the power performance decided by the power performance switching deciding means 18a. Numeral 16 designates an output torque map which is referred to when the output torque command calculating means 15 calculates the output torque command. Each map is composed of at least two power performance plots corresponding to the individual power performances. In this case, each of the output torque command map of FIG. 17 and the torque output factor map of FIG. 18 has both a power mode plot and an economy mode plot. In FIGS. 17 and 18, solid curves indicate the power mode plots, and broken curves indicate the economy mode plots.

Numeral 17 designates output torque command output means for outputting the output torque command, which is calculated by the output torque command calculating means 1, to the motor 25. In response to the output torque command from the output torque command output means 17, the motor 25 is driven to generate an output torque corresponding to the motor current.

In an electromobile thus constructed, when the driver depresses the accelerator pedal while holding the shift lever in the forward range (i.e., D-range), for example, the output torque command calculating means 15 receives the signal for vehicle speed calculated by the vehicle speed calculating means 12a and the signal for accelerator opening calculated by the accelerator opening calculating means 13a, to calculate the output torque command with reference to the output torque map 16, i.e., the output torque command map of FIG. 17 and the torque output factor map of FIG. 18.

If the driver then switches to the power mode, the economy mode or the like by operation of the power/economy mode switch or the like, the power performance switching means 18 detects that switching to produce a switching signal, which is received by the power performance switching deciding means 18a to decide the power performance.

In response to the power performance signal of the power performance switching deciding means 18a, the output torque command calculating means 15 selects one of the plots in the output torque map 16 and calculates the output torque command with reference to the selected plot.

In accordance with the vehicle speed signal of the vehicle speed calculating means 12a, more specifically, the output torque command calculating means 15 refers to one of the power performance plots (e.g., the power mode plot or the economy mode plot) in the output torque command map of FIG. 17 and calculates the maximum output torque command for the accelerator opening of 100[%]. Next, the accelerator opening calculating means 13a calculates the accelerator opening from the signal representative of the accelerator pedal depression.

Subsequently, the output torque command calculating means 15 refers to one of the power performance plots (e.g., the power mode plot or the economy mode plot) in the torque output factor map of FIG. 18 in accordance with the accelerator opening signal and calculates the torque output factor for the accelerator opening at that instant and the output torque command at this instant is calculated by multiplying the maximum output torque command by the torque output factor.

The power/economy mode switch is used here as the power performance switching means 18. If this power performance switching means 18 is a variable resistor, the values of the maximum output torque command set according to the output torque command map and the torque output factor set according to the torque output factor map can be continuously changed to provide a drive more desirable to the driver.

On the other hand, the maps can be automatically switched according to the speed of depression of the accelerator pedal. In this case, the economy mode of the electromobile can be automatically switched to the power mode even during running if the accelerator pedal is abruptly depressed.

Incidentally, in the electromobile using no transmission, the regenerative braking forces for the equal depressions of the accelerator pedal are equal. This makes it impossible to set a braking torque, in contrast to engine braking in a gasoline-powered automobile. Moreover, if the regenerative braking force for each range position is fixed, a high load is applied to the battery 26 (as shown in FIG. 11) in high-speed running, i.e., at a high voltage so that the battery power is more quickly depleted.

Therefore, output torque command maps are prepared for the forward range, the low (L) range and reverse (R) range so that different braking torques may be set in the output torque command maps for the forward range and the low range.

These braking torques can be changed according to the vehicle speed so that no high load is applied to the battery during the high-speed running, thereby improving the range (distance of travel) allowed by the battery before recharging is required.

Figure 20:
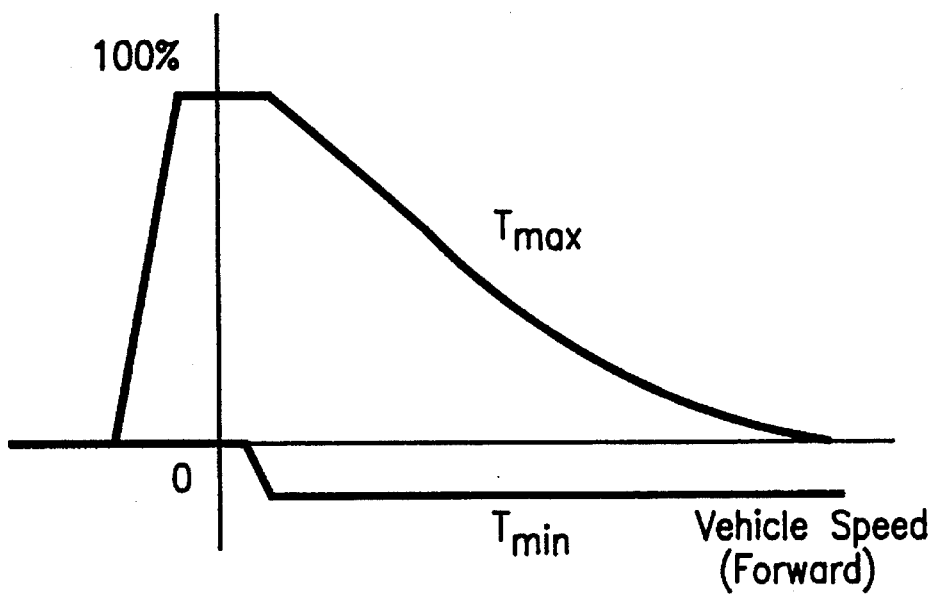
FIG. 20 is an output torque command map for the forward range to be used in the output torque control unit wherein the vertical axis represents the value of the output torque command and the horizontal axis represents vehicle speed.
Figure 21:
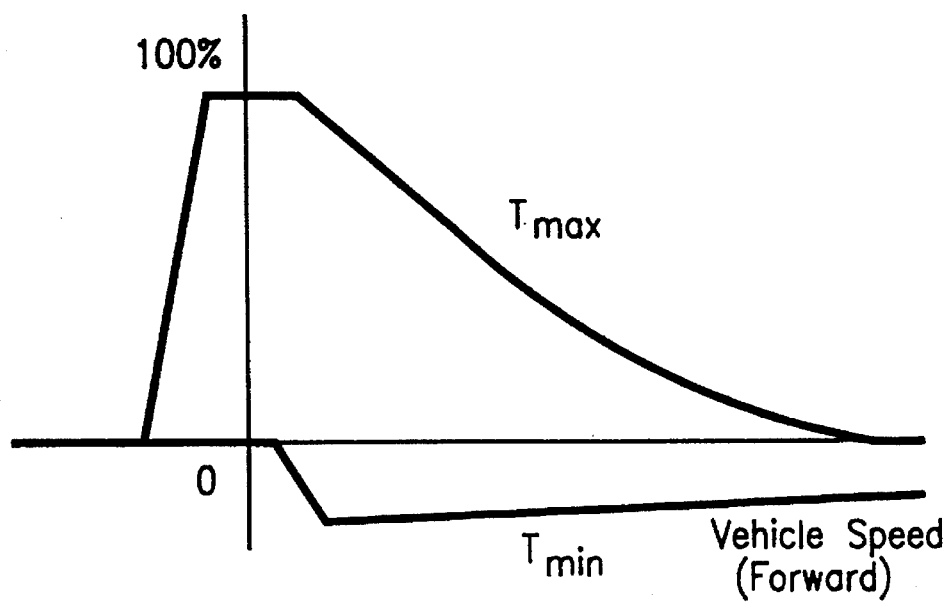
FIG. 21 is an output torque command map for the low range to be used in the output torque control unit wherein the vertical axis represents the value of the output torque command and the horizontal axis represents vehicle speed.

In FIGS. 20 and 21, the output torque command map for the forward range and the low range, respectively, have first quadrants indicating the state in which the motor 25 (as shown in FIG. 1) is driven in forward running, second quadrants indicating backing in the forward range, e.g. slipping downhill backward with the vehicle in forward, third quadrants indicating reverse running, and fourth quadrants indicating regenerative braking in forward running. As a result, the braking torque is determined by the minimum $T_{min}$ of the output torque command of the third quadrant.

Figure 22:
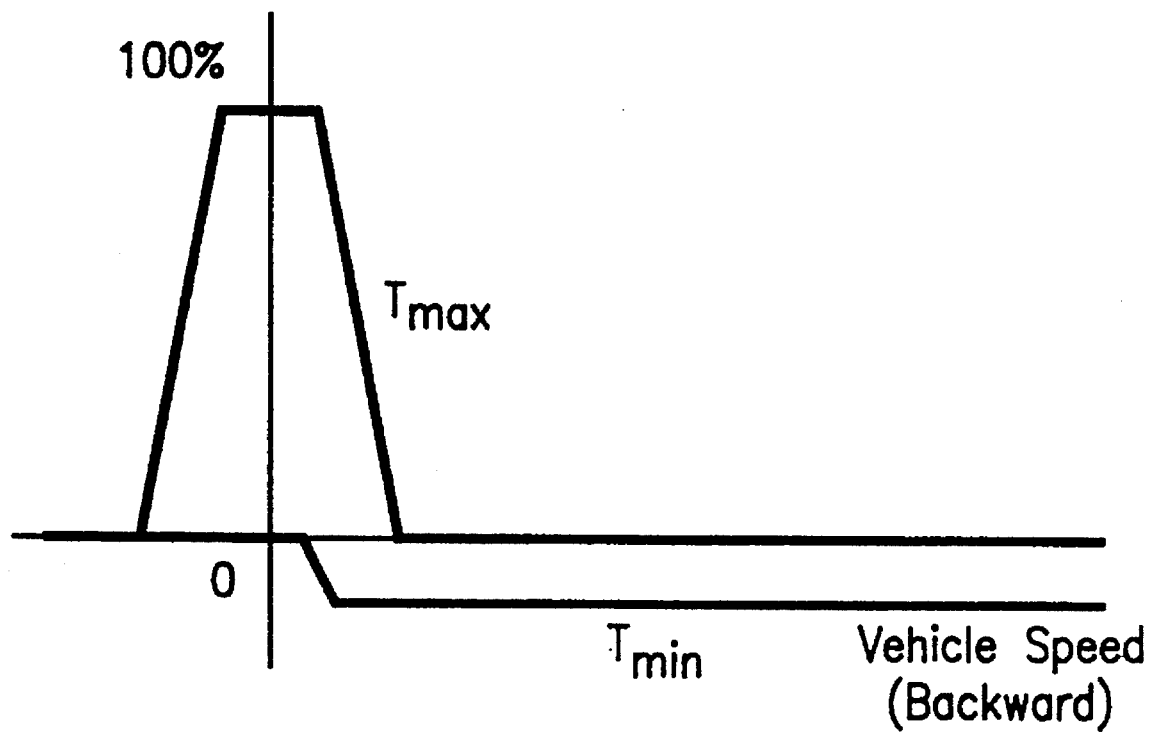
FIG. 22 is an output torque command map for the reverse range to be used in the output torque control unit wherein the vertical axis represents the value of the output torque command and the horizontal axis represents vehicle speed.

In FIG. 22, on the other hand, the output torque command map for the reverse range has its first quadrant indicating the state in which the motor (of FIG. 1) is driven in reverse running, its second quadrant indicating the accelerating state at the start, its third quadrant indicating forward running, and its fourth quadrant indicating regenerative braking in reverse running. As a result, the braking torque is determined by the minimum $T_{min}$ of the output torque command of the third quadrant. Incidentally, this output torque command map for the reverse range provides that the output torque command is set to 0 when the vehicle speed reaches 30 [Km/h] in the first quadrant. Thus, safety is retained by avoiding excessive speed in reverse running.

Step S31:
   The routine is initialized.
Step S32:
   It is decided whether or not the ignition is OFF. The routine advances to Step S33, if the ignition is OFF, but to Step S34 if ON.
Step S33:
   The routine is terminated.
Step S34:
   The accelerator opening is calculated from the signal for depression of the accelerator pedal by the accelerator opening calculating means 13a (as shown in FIG. 16).
Step S35:
   The vehicle speed is calculated from the r.p.m. signal by the vehicle speed calculating means 12a.
Step S36:
   The selected range is decided from the signal of the range position by the range deciding means 21a.
Step S37:
   It is decided whether or not the range decided by the range deciding means 21a is the neutral range. The routine advances to Step S38, if the answer is YES, but to Step S39 if NO.
Step S38:
   The maximum $T_{max}$ and the minimum $T_{min}$ of the output torque command are set to 0.
Step S39:
   It is decided whether or not the range decided by the range deciding means 21a is forward. The routine advances to Step S40, if the answer is YES, but to Step S41 if
Step S40:
   The maximum $T_{max}$ and the minimum $T_{min}$ of the output torque command are read with reference to the output torque command map for the forward range of FIG. 20.
Step S41:
   It is decided whether or not the range decided by the range deciding means 21a is the low range. The routine advances to Step S42, if the answer is YES, but to Step S43 if NO.

Step S42:
   The maximum $T_{max}$ and the minimum $T_{min}$ of the output torque command are read with reference to the output torque command map for the low range of FIG. 21.
Step S43:
   It is decided whether or not the range decided by the range deciding means 21a is the reverse range. The routine advances to
Step S44, if the answer is YES, but to
Step S45 if NO.
Step S44:
   The maximum $T_{max}$ and the minimum $T_{min}$ of the output torque command are read with reference to the output torque command map for the reverse range of FIG. 22.
Step S45:
   The maximum $T_{max}$ and the minimum $T_{min}$ of the output torque command are set to 0 if the range decided by the range deciding means 21a does not belong to any range (R, D, L and N), for example, in the case where the decided range is parking (P) and in the case of a malfunction of the range deciding means 21a.
Step S46:
   The output torque command of each range is calculated by the output torque command calculating means 15. The output torque commands is expressed, if designated as T, as follows:

$$T = C(T_{max} - T_{min}) - T_{min}$$

wherein C: Accelerator Opening.
Step S47:
   The output torque command T is output to the motor 25 by the output torque command output means 17, and the routine is returned to Step S32.

The present invention should not be limited to the foregoing embodiments but can be modified in various manners without departing from the gist thereof, and these modifications should not be excluded from the scope of the present invention.

What is claimed is:
1. An electromobile comprising:
   (a) a motor for converting a motor current into an output torque for driving the electromobile;
   (b) output torque cut commanding means for commanding the cutting of the output torque of said motor responsive to detection of a predetermined condition;
   (c) output torque command calculating means for calculating an output torque command corresponding to the speed and accelerator opening of said electromobile and changing said output torque command to a value for stopping said motor in response to a command from said output torque cut commanding means;
   (d) a motor driving circuit for feeding the motor current to said motor in accordance with the output torque command which is calculated by said output torque command calculating means; and
   (e) output torque cutting means packaged in said motor driving circuit for cutting the output torque of said motor in direct response to the command of said torque cut commanding means.

2. An electromobile according to claim 1, wherein said output torque cutting means decreases the output torque gradually in response to the command of said output torque cut commanding means.

3. An electromobile according to claim 2, further comprising:

a signal delay circuit connected between said output torque cut commanding means and said output torque cutting means;

wherein said output torque command calculating means decreases the output torque command gradually over a predetermined time period, and wherein said signal delay circuit outputs a signal for instructing the cutting of the output torque of said motor, after the predetermined time period, to said output torque cutting means.

4. An electromobile comprising:

a power source;

a motor for converting motor current into an output torque for driving the electromobile;

a shift switch for detecting a range selected by a driver and for outputting a torque cutting signal responsive to detection of selection of a predetermined range;

a CPU for calculating an output torque command corresponding to vehicle speed and accelerator opening of the electromobile;

a motor controller for outputting a signal for controlling said motor in response to the output torque command;

an inverter circuit for receiving current from said power source and for converting the received current, in accordance with the signal of said motor controller, into the motor current fed to said motor; and torque cutting means connected between said shift switch and said inverter circuit for outputting a motor stopping signal directly to said inverter circuit in response to said torque cutting signal from said shift switch.

5. An electromobile according to claim 4, wherein said torque cutting means includes a drive signal interrupting circuit for interrupting the signal of said motor controller to said inverter circuit.

6. An electromobile according to claim 4, wherein said torque cutting means includes a current interrupting mechanism for interrupting the current received by said inverter circuit.

7. An electromobile according to claim 4, wherein said predetermined range is a non-drive range.

8. An electromobile comprising:

a motor for converting motor current into an output torque for driving the electromobile;

a shift switch for detecting a range selected by a driver;

a CPU for calculating an output torque command corresponding to the vehicle speed and the accelerator opening of the electromobile;

a motor controller for outputting a signal for controlling said motor in response to the output torque command from said CPU;

an inverter circuit for receiving current from the power source and for converting the received current, in accordance with the signal of said motor controller, into the motor current to said motor; and a drive signal interrupting circuit connected between said motor controller and said inverter circuit for outputting a motor stopping signal directly to said inverter circuit in response to a torque cutting signal from said shift switch or said CPU.

9. An electromobile according to claim 8, wherein said CPU outputs a signal for decreasing the output torque gradually to said drive signal interrupting circuit in response to said torque cutting signal from said shift switch.

10. An electromobile according to claim 8, further comprising a signal delay circuit connected between said shift switch and said drive signal interrupting circuit, wherein said CPU decreases the output torque gradually over a predetermined time period, and wherein said signal delay circuit outputs a signal instructing the cutting of the output torque of said motor, after the predetermined time period, to said drive signal interrupting circuit.

* * * * *

UNITED STATES PATENT AND TRADEMARK OFFICE
CERTIFICATE OF CORRECTION

PATENT NO. : 5,471,384
DATED : November 28, 1995
INVENTOR(S) : NAKASHIMA et al

It is certified that error appears in the above-indentified patent and that said Letters Patent is hereby corrected as shown below:

On the title page, item [73] under the heading "Assignee:"
"Aishin AW Co., Ltd." should read --Aisin AW Co., Ltd.--.

Col. 5, line 25, after "control" insert --is--;
        line 26, before "returned" insert --is--;
        line 33, begin a new paragraph with "By".

Col. 6, line 36, delete "Step".

Col. 8, line 30, delete "out" insert --cut--; and
        line 47, delete "$a_1$" and insert --$a_2$--.

Col. 9, line 59, delete "1" and insert --15--.
Col. 11, line 57, after "if" insert --NO--.

Signed and Sealed this

Thirteenth Day of August, 1996

Attest:

BRUCE LEHMAN

*Attesting Officer*         *Commissioner of Patents and Trademarks*